US012627915B2

(12) United States Patent
Yue

(10) Patent No.: US 12,627,915 B2
(45) Date of Patent: May 12, 2026

(54) SPEAKER AND SPEAKER BOX

(71) Applicants: GUANGZHOU SHIYUAN ELECTRONIC TECHNOLOGY COMPANY LIMITED, Guangzhou (CN); GUANGZHOU SHIYUAN ARTIFICIAL INTELLIGENCE INNOVATION RESEARCH INSTITUTE CO., LTD., Guangzhou (CN)

(72) Inventor: Weiyong Yue, Guangzhou (CN)

(73) Assignees: GUANGZHOU SHIYUAN ELECTRONIC TECHNOLOGY COMPANY LIMITED, Guangzhou (CN); GUANGZHOU SHIYUAN ARTIFICIAL INTELLIGENCE INNOVATION RESEARCH INSTITUTE CO., LTD., Guangzhou (CN)

( * ) Notice: Subject to any disclaimer, the term of this patent is extended or adjusted under 35 U.S.C. 154(b) by 162 days.

(21) Appl. No.: 18/741,731

(22) Filed: Jun. 12, 2024

(65) Prior Publication Data

US 2024/0334105 A1 Oct. 3, 2024

Related U.S. Application Data

(63) Continuation of application No. PCT/CN2023/070158, filed on Jan. 3, 2023.

(30) Foreign Application Priority Data

Jan. 17, 2022 (CN) ......................... 202220121458.2

(51) Int. Cl.
*H04R 1/02* (2006.01)
*H04R 9/02* (2006.01)
(Continued)

(52) U.S. Cl.
CPC ............. *H04R 1/025* (2013.01); *H04R 9/022* (2013.01); *H04R 9/025* (2013.01); *H04R 9/045* (2013.01); *H04R 9/06* (2013.01); *H04R 2400/11* (2013.01)

(58) Field of Classification Search
CPC ........ H04R 1/025; H04R 9/022; H04R 9/025; H04R 9/045; H04R 9/06; H04R 2400/11; H04R 2499/11
(Continued)

(56) References Cited

U.S. PATENT DOCUMENTS

2020/0366996 A1* 11/2020 Kosuda ............... H04M 1/6058

FOREIGN PATENT DOCUMENTS

| | | |
|---|---|---|
| CN | 201789625 U | 4/2011 |
| CN | 202425026 U | 9/2012 |
| KR | 20110002370 A | 1/2011 |

OTHER PUBLICATIONS

European Search Report issued in European application No. 23739846.6, mailed Feb. 12, 2025, 34 pages.

* cited by examiner

*Primary Examiner* — Paul Kim
(74) *Attorney, Agent, or Firm* — BAYES PLLC

(57) ABSTRACT

The present disclosure provides a speaker and a speaker box. The speaker includes a frame, a U-yoke and a voice coil portion. The frame includes two side walls disposed opposite to each other, and there is an interconnected accommodating cavity and mounting hole between the two side walls. The maximum distance between the two side walls in the mounting hole is A, and the distance between the two side walls in the accommodating cavity is B, where A>B. The U-yoke is arranged in the mounting hole, an outer wall of the U-yoke fits an inner wall of the mounting hole. A part of the
(Continued)

voice coil portion is located in the U-yoke, and the other part of the voice coil portion is located in the accommodating cavity.

10 Claims, 6 Drawing Sheets

(51) Int. Cl.
*H04R 9/04* (2006.01)
*H04R 9/06* (2006.01)
(58) Field of Classification Search
USPC .......................................................... 381/386
See application file for complete search history.

SPEAKER AND SPEAKER BOX

CROSS-REFERENCE TO RELATED APPLICATION

The present disclosure is a continuation of International Application No. PCT/CN2023/070158, filed on Jan. 3, 2023, which claims priority to a Chinese patent application with the application Ser. No. 202220121458.2, titled "SPEAKER AND SPEAKER BOX" and filed on Jan. 17, 2022. The entire contents of the above applications are incorporated in the present disclosure by reference.

TECHNICAL FIELD

The present disclosure relates to the technology field of speaker boxes, and in particular, to a speaker and a speaker box.

TECHNICAL BACKGROUND

Speakers in the related art usually use magnetic flux generated by a magnetic gap between a voice coil portion and a U-yoke to vibrate the voice coil portion, so as to realize the sound generation of the speaker. Some TV sets and flat-panel video products on the market now have better sound effects, in which the speaker is installed on the frame, so that the speaker emits sound forward, which facilitates the spread of sound and improves the sound quality. In order to meet the appearance requirements of narrow frames, the width of the speakers needs to be reduced as much as possible, and in order to ensure the consistency of the sound effect, most TV speakers are installed into speaker box shells and uniformly made into passive speaker boxes for use in TV sets.

In the related art, during the process of installing the speaker into the speaker box shell, an auxiliary structure must be provided on an edge of the frame of the speaker to cooperate with the speaker box shell, so as to achieve mounting and sealing. This part of the structure can only be achieved by widening the width of the frame or reducing the magnetic circuit between the U-yoke and the voice coil portion, which causes that the width of the speaker cannot be made smaller, or the sound effect of the speaker becomes worse and cannot meet the product requirements. Therefore, it is difficult to achieve a balance between size and sound effect and needs to be further optimized.

SUMMARY

The present disclosure provides a speaker and a speaker box to reduce a size of the speaker while ensuring the sound effect of the speaker.

In order to achieve the above objective, according to one aspect of the present disclosure, a speaker is provided, including a frame, a U-yoke and a voice coil portion. The frame includes two side walls disposed opposite to each other, and there is an interconnected accommodating cavity and mounting hole between the two side walls. The maximum distance between the two side walls in the mounting hole is A, and the distance between the two side walls in the accommodating cavity is B, where A>B. The U-yoke is arranged in the mounting hole, an outer wall of the U-yoke fits an inner wall of the mounting hole. A part of the voice coil portion is located in the U-yoke, and the other part of the voice coil portion is located in the accommodating cavity.

Furthermore, an inner side of the side wall has an arc-shaped surface. The arc-shaped surface fits the outer wall of the U-yoke, and the minimum wall thickness at a position of the arc-shaped surface of the side wall is smaller than the wall thickness at other positions of the side wall.

Furthermore, the frame further includes a connecting structure, and the connecting structure includes two arc-shaped walls, and both ends of the arc-shaped walls are respectively connected to the two side walls. The two arc-shaped walls and two opposite arc-shaped surfaces surround to form mounting holes.

Furthermore, the frame further includes a bracket, the bracket is located between the two side walls, and the connecting structure is located in an area formed around the bracket. The voice coil portion includes a cylinder and a vibration piece sleeved on the cylinder, and the vibration piece is connected to the bracket.

Furthermore, the bracket includes two support blocks and two connecting ribs. The two arc-shaped walls of the connecting structure are located between the two support blocks. Each arc-shaped wall is connected to the corresponding support block by the connecting rib. The support block has a limiting groove. The two ends of the vibration piece are respectively arranged in the limiting grooves of the two support blocks.

Furthermore, the voice coil portion includes a cylinder, an internal magnetic circuit structure and a voice coil. The cylinder extends into the U-yoke, one end of the internal magnetic circuit structure is located in the cylinder, the other end of the internal magnetic circuit structure abuts against the U-yoke, and the voice coil sleeves are provided on the cylinder. The voice coil is located between the internal magnetic circuit structure and the U-yoke.

Furthermore, the frame further includes a bottom plate, and the bottom plate is connected to the two side walls. The bottom plate is away from the mounting holes. The outer surface of the bottom plate flushes with end faces of the side walls, and the bottom surface of the U-yoke flushes with the outer surface of the bottom plate.

Furthermore, a plurality of balance holes are provided on the bottom plate, and each balance hole is connected to the accommodating cavity.

Furthermore, there are a plurality of mounting holes in the frame, and there are a plurality of U-yokes that are arranged in the plurality of mounting holes in one-to-one correspondence. The outer surfaces of the two side walls are both planes, and the outer surfaces of the two side walls are parallel to each other.

Furthermore, the frame further includes two vertical plates and two lugs. Both ends of the vertical plates are respectively connected to the two side walls. The two side walls and the two vertical plates are connected to form a rectangular structure. The two lugs are respectively arranged on two vertical plates.

According to another aspect of the present disclosure, a speaker box is provided. The speaker box includes a speaker box shell and the above-mentioned speaker. The frame of the speaker is connected to the speaker box shell.

Furthermore, the speaker box shell has a mounting groove, the speaker is arranged in the mounting groove, the side wall of the speaker flushes with the side surface of the speaker box shell, the speaker box shell has a balance cavity, and the bottom wall of the mounting groove has a plurality of communication holes communicating with the balance cavity which are communicated with the accommodating cavity of the speaker.

Furthermore, the speaker box further includes a heat sink. The bottom wall of the mounting groove has a groove. The heat sink is arranged in the groove, and the heat sink fits the bottom surface of the U-yoke of the speaker.

By applying the technical solution of the present disclosure, a speaker is provided. The speaker includes a frame, a U-yoke and a voice coil portion. The frame includes two side walls disposed opposite to each other. There is an interconnected accommodating cavity and mounting hole between the two side walls. The maximum distance between the two side walls in the mounting hole is A, and the distance between the two side walls in the accommodating cavity is B, where A>B. The U-yoke is arranged in the mounting hole, an outer wall of the U-yoke fits an inner wall of the mounting hole. A part of the voice coil portion is located in the U-yoke, and the other part of the voice coil portion is located in the accommodating cavity. Using this solution, the U-yoke is arranged in the mounting hole of the frame, that is, the U-yoke is arranged between the two side walls. Compared with the situation in the related art where the U-yoke is arranged outside the frame, there is no need to arrange structures for installing and sealing the frame on the side wall of both sides of the U-yoke, which increases the overall width of the frame. The wall thickness of the side wall where the U-yoke is installed is thinned to accommodate the U-yoke, which fully utilizes the width of the frame and maximizes the size of the U-yoke, so that it is beneficial to increasing the size of the U-yoke and magnetic circuit, thereby improving the performance of the speaker. When the width of the frame of this solution is the same as that of the related art, the arrangement of this solution improves the performance of the speaker. When the performance of the speaker of this solution is the same as that of the related art, the arrangement of this solution reduces the overall size of the speaker.

BRIEF DESCRIPTION OF DRAWINGS

The drawings that constitute a part of the present disclosure are used to provide a further understanding of the present disclosure. The illustrative embodiments and their descriptions of the present disclosure are used to explain the present disclosure and do not constitute an improper limitation of the present disclosure. In the figures.

Figure 1:
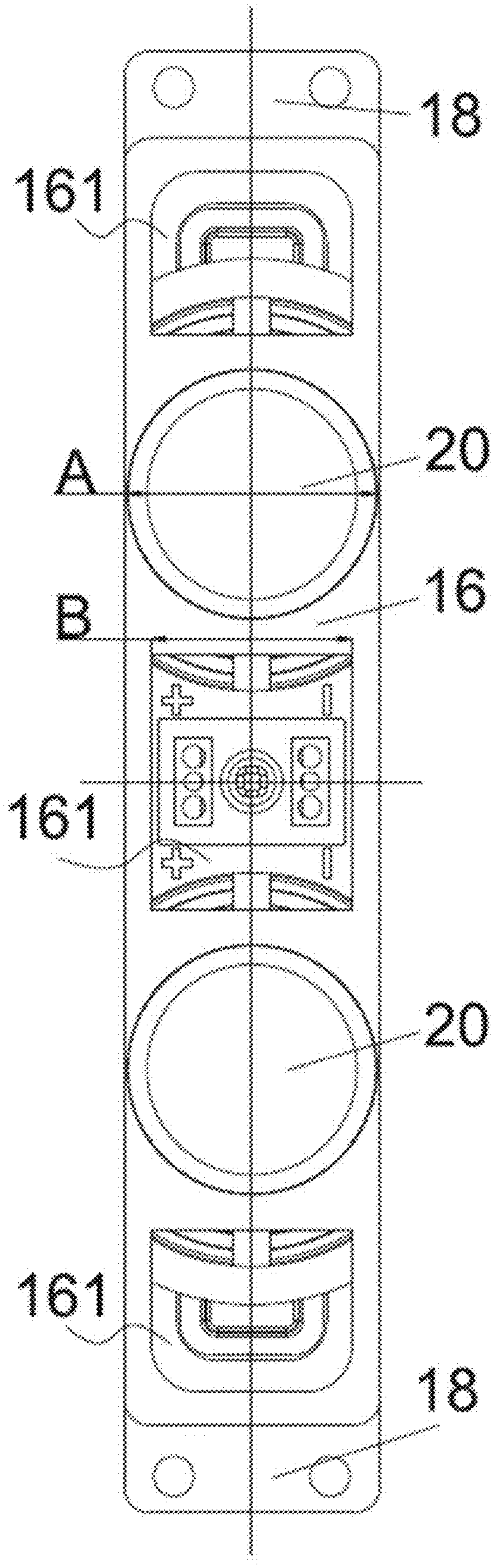
FIG. 1 shows a schematic structural diagram of a speaker according to an embodiment of the present disclosure.
Figure 2:
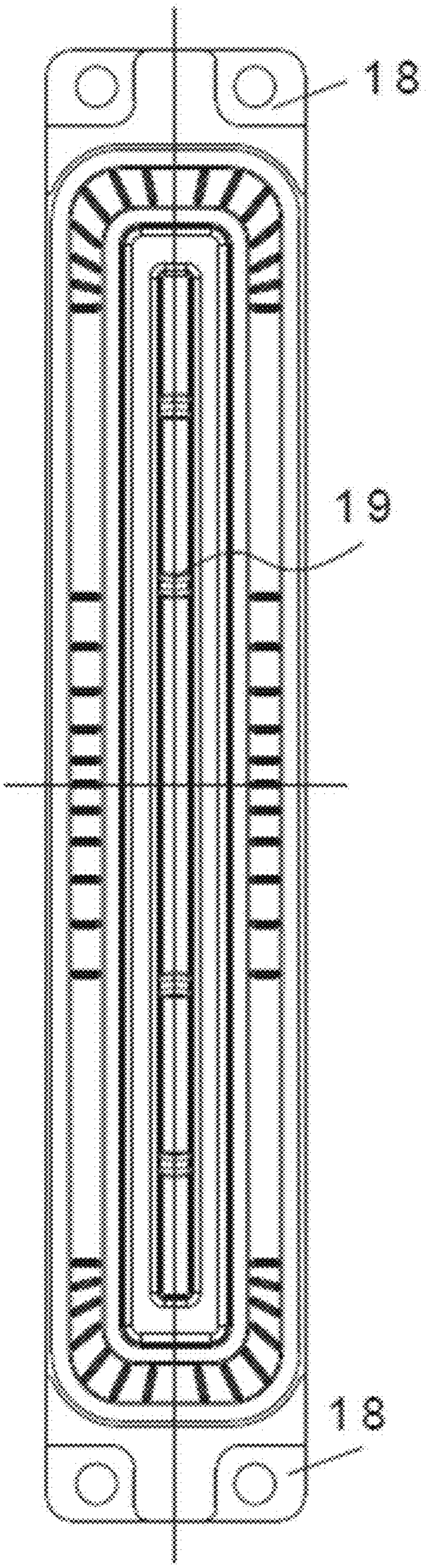
FIG. 2 shows a view of the speaker of FIG. 1 from the other side.

The above-mentioned drawings include the following reference signs:

10. Frame; 11. Side wall; 111. Arc-shaped surface; 12. Accommodating cavity; 13. Mounting hole; 14. Connecting structure; 141. Arc-shaped wall; 15. Bracket; 151. Support block; 152. Connecting ribs; 153. Limiting groove; 16. Bottom plate; 161. Balance hole; 17. Vertical plate; 18. Lug; 19. Top cover;

20. U-yoke;

30. Voice coil portion; 31. Cylinder; 32. Vibration piece; 33. Internal magnetic circuit structure; 34. Voice coil;

40. Speaker box shell; 41. Balance cavity; 42. Communication hole; 43. Heat sink; 44. Groove; 45. Elastic sleeve.

DETAILED DESCRIPTION

The technical solutions in the embodiments of the present disclosure will be clearly and completely described below with reference to the accompanying drawings in the embodiments of the present disclosure. Obviously, the described embodiments are only some of the embodiments of the present disclosure, but not all of the embodiments. The following description of at least one exemplary embodiment is merely illustrative in nature and is in no way intended to limit the present disclosure or its application or uses. Based on the embodiments in the present disclosure, all other embodiments obtained by those skilled in the art without creative efforts fall within the scope of protection of the present disclosure.

As shown in FIGS. 1 to 4, according to embodiments of the present disclosure, a speaker is provided. The speaker includes a frame 10, a U-yoke 20 and a voice coil portion 30. The frame 10 includes two side walls 11 arranged oppositely, and there is an interconnected accommodating cavity 12 and mounting hole 13 between the two side walls 11. When the maximum distance between the two side walls 11 in the mounting hole 13 is A, and the distance between the two side walls 11 in the accommodating cavity 12 is B, where A>B. The U-yoke 20 is arranged in the mounting hole 13. An outer wall of the U-yoke 20 fits an inner wall of the mounting hole 13. A part of the voice coil portion 30 is located in the U-yoke 20, and the other part of the voice coil portion 30 is located in the accommodating cavity 12.

In this embodiment, the U-yoke 20 is arranged in the mounting hole 13 of the frame 10, that is, the U-yoke 20 is arranged between the two side walls 11. Compared with the situation in the related art where the U-yoke is arranged outside the frame, there is no need to arrange structures for installing and sealing the frame 10 on the side wall 11 of both sides of the U-yoke 20, which increases the overall width of the frame 10. The wall thickness of the side wall 11 where the U-yoke 20 is installed is thinned to accommodate the U-yoke 20, which fully utilizes the width of the frame 10 and maximizes the size of the U-yoke 20, and further increases the size of the voice coil portion 30, so that it is beneficial to increasing the magnetic circuit, thereby improving the performance of the speaker. When the width of the frame of this solution is the same as that of the related art, the arrangement of this solution improves the performance of the speaker. When the performance of the speaker of this solution is the same as that of the related art, the arrangement of this solution reduces the overall size of the speaker.

Specifically, an inner side of the side wall 11 has an arc-shaped surface 111, the arc-shaped surface 111 fits the outer wall of the U-yoke 20, and the minimum wall thickness at a position of the arc-shaped surface 111 of the side wall 11 is smaller than the wall thickness at other positions of the side wall 11. With this arrangement, the wall thickness of the side wall 11 at the position where the U-yoke 20 is installed is reduced, thereby reducing the overall size of the speaker while installing the larger U-yoke 20. Specifically, a step surface is further formed at the thinned position of the side wall 11, and the U-yoke 20 abuts against the step surface, thereby limiting the axial position of the U-yoke 20.

Figure 3:
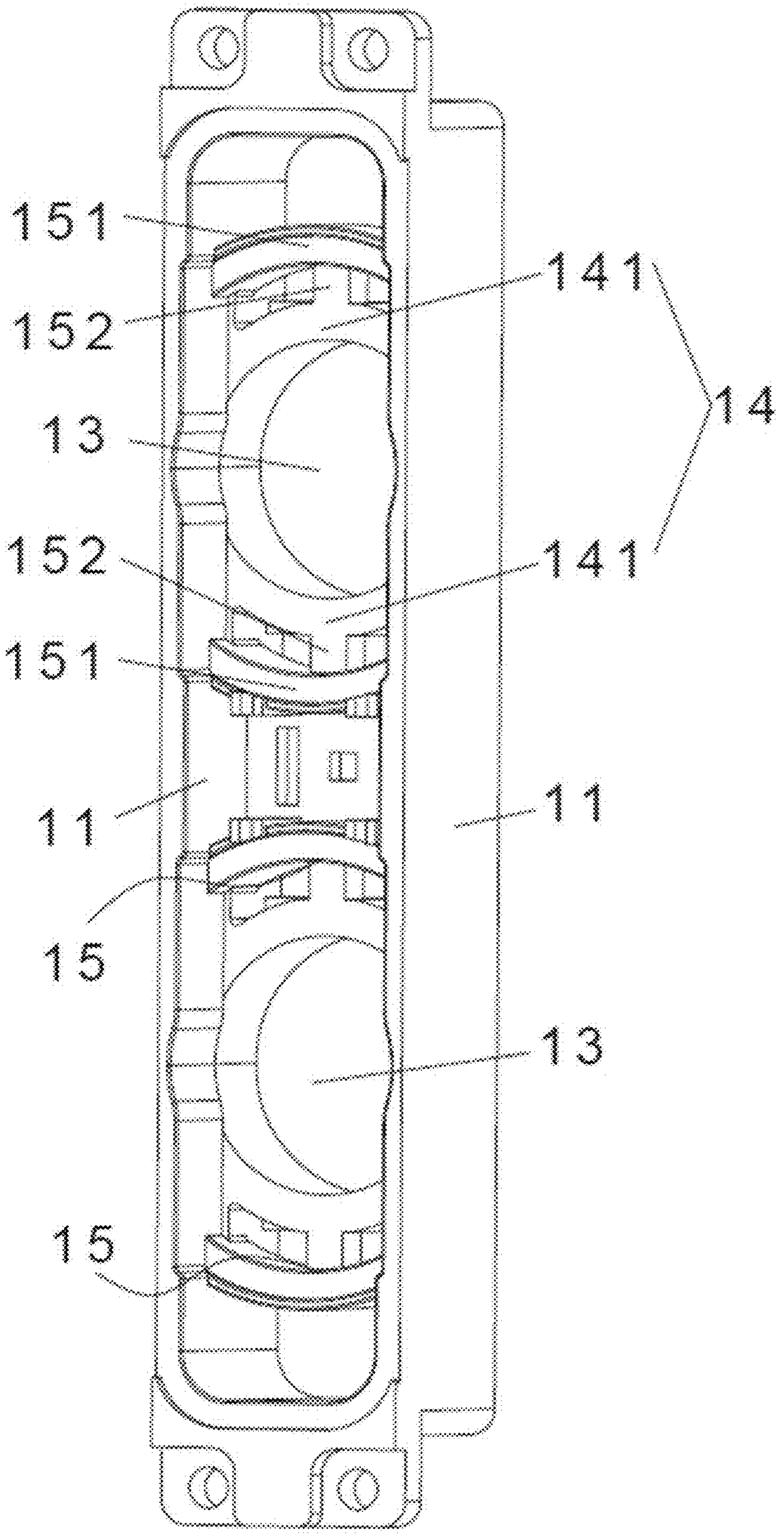
FIG. 3 shows a schematic structural view of the frame in the speaker of FIG. 1.

As shown in FIG. 3, the frame 10 further includes a connecting structure 14. The connecting structure 14 includes two arc-shaped walls 141. Both ends of the arc-shaped wall 141 are connected to the two side walls 11 respectively. The two arc-shaped walls 141 and two opposite arc-shaped surfaces 111 surround to form mounting holes 13. With this arrangement, by surrounding the two arc-shaped walls 141 and two opposite arc-shaped surfaces 111 to form mounting holes 13, matching and limiting in the entire circumferential direction of the U-yoke 20 is achieved, thereby ensuring reliability of the mounting of the U-yoke 20. Specifically, the mounting hole 13 is a circular hole, and the outer surface of U-yoke 20 is a cylindrical surface.

Specifically, the frame 10 further includes a bracket 15, the bracket 15 is located between the two side walls 11, and the connecting structure 14 is located in an area formed around the bracket 15. The voice coil portion 30 includes a cylinder 31 and a vibration piece 32 sleeved on the cylinder 31, and the vibration piece 32 is connected to the bracket 15.

In this embodiment, the bracket 15 is connected to the connecting structure 14, and the vibration piece 32 of the voice coil portion 30 is connected to the bracket 15. In this way, the bracket 15 can support the vibration piece 32 and limit the movement range of the vibration piece 32, thereby ensuring the reliability of the speaker. Specifically, along the axial direction of the mounting hole 13, there is a gap between the vibration piece 32 and the arc-shaped wall 141, which ensures the reliability of the vibration of the vibration piece 32.

In some embodiments, the two side walls 11 of the frame 10 are provided with arc-shaped grooves, contours of the arc-shaped grooves match contours of the vibration pieces 32, and a contour size of the arc-shaped grooves is larger than that of the vibration piece 32. This arrangement can prevent the vibration piece 32 from being limited by the two side walls 11 resulting in a limited vibration range, and ensure the reliability of the vibration of the vibration piece 32 in the limiting groove. Moreover, by arranging the arc-shaped groove to keep away from the vibration piece 32, the structure of the speaker compacts, which is beneficial to reducing the overall size.

Furthermore, the bracket 15 includes two support blocks 151 and two connecting ribs 152. The two arc-shaped walls 141 of the connecting structure 14 are located between the two support blocks 151. Each arc-shaped wall 141 is connected to the corresponding support block 151 by the connecting rib 152. The support block 151 has a limiting groove 153. Both ends of the vibration piece 32 are respectively arranged in the limiting grooves 153 of the two support blocks 151. With this arrangement, the bracket 15 and the connecting structure 14 form an integrated structure, which increases the structural strength of the frame 10. Specifically, the two support blocks 151 are arc-shaped blocks.

Furthermore, the voice coil portion 30 includes a cylinder 31, an internal magnetic circuit structure 33 and a voice coil 34. The cylinder 31 extends into the U-yoke 20. One end of the internal magnetic circuit structure 33 is located in the cylinder 31, and the other end of the internal magnetic circuit structure 33 abuts against the U-yoke 20. The voice coil 34 sleeves are on the cylinder 31, and the voice coil 34 is located between the internal magnetic circuit structure 33 and the U-yoke 20.

In this embodiment, a magnetic circuit is formed between the U-yoke 20 and the internal magnetic circuit structure 33, and the voice coil 34 is located in the magnetic circuit. When the speaker is in a working state, magnetic flux is generated in the magnetic circuit, and the voice coil 34 is affected by the magnetic flux to cause vibration in the magnetic circuit. The voice coil 34 and the vibration piece 32 are connected together through the cylinder 31. The voice coil 34 vibrates and further drives the vibration piece 32 to vibrate in the limiting groove 153, thereby realizing the sound generation of the speaker. Specifically, a size of the U-yoke 20 in this embodiment is maximized while the width of the frame 10 remains unchanged, so that the voice coil portion 30 is also enlarged, thereby increasing the magnetic circuit and the voice coil 34 and improving the sound effects of the speaker.

Specifically, in a direction from the bottom plate 16 of the speaker toward a top cover 19, the internal magnetic circuit structure 33 is composed of magnets, washers and auxiliary magnets in order.

As shown in FIG. 1, the frame 10 further includes a bottom plate 16, and the bottom plate 16 is connected to the two side walls 11. The bottom plate 16 is away from the mounting holes 13. The outer surface of the bottom plate 16 flushes with end faces of the side walls 11, and the bottom surface of the U-yoke 20 flushes with the outer surface of the bottom plate 20. This arrangement increases the structural strength of the frame 10 and facilitates sealing of the cavity within the speaker.

Specifically, a plurality of balance holes 161 are provided on the bottom plate 16, and each balance hole 161 is communicated with the accommodating cavity 12. With this arrangement, the air pressure generated at the bottom of the frame 10 can be discharged through the balance hole 161 when the speaker is in the working state, thereby preventing the air pressure from being retained in the accommodating cavity 12 and affecting the vibration frequency of the vibration piece 32. Specifically, a cavity obtained by removing the mounting hole 13 between the two sidewalls 11 forms the accommodating cavity 12.

Furthermore, there are a plurality of mounting holes 13 in the frame 10, and there are a plurality of U-yokes 20 that are arranged in the plurality of mounting holes 13 in one-to-one correspondence. The outer surfaces of the two side walls 11 are both planes, and the outer surfaces of the two side walls 11 are parallel to each other. With this arrangement, by arranging a plurality of U-yokes 20, a plurality of voice coil portions 30 can be arranged correspondingly. Through the joint action of multiple sets of voice coil portions 30 and U-yokes 20, the sound effect of the speaker is improved.

Specifically, there are a plurality of brackets 15, a plurality of mounting holes 13, a plurality of brackets 15, a plurality of U-yokes 20, a plurality of voice coil portions 30 and a plurality of connecting structures 14 which are provided correspondingly.

Figure 4:
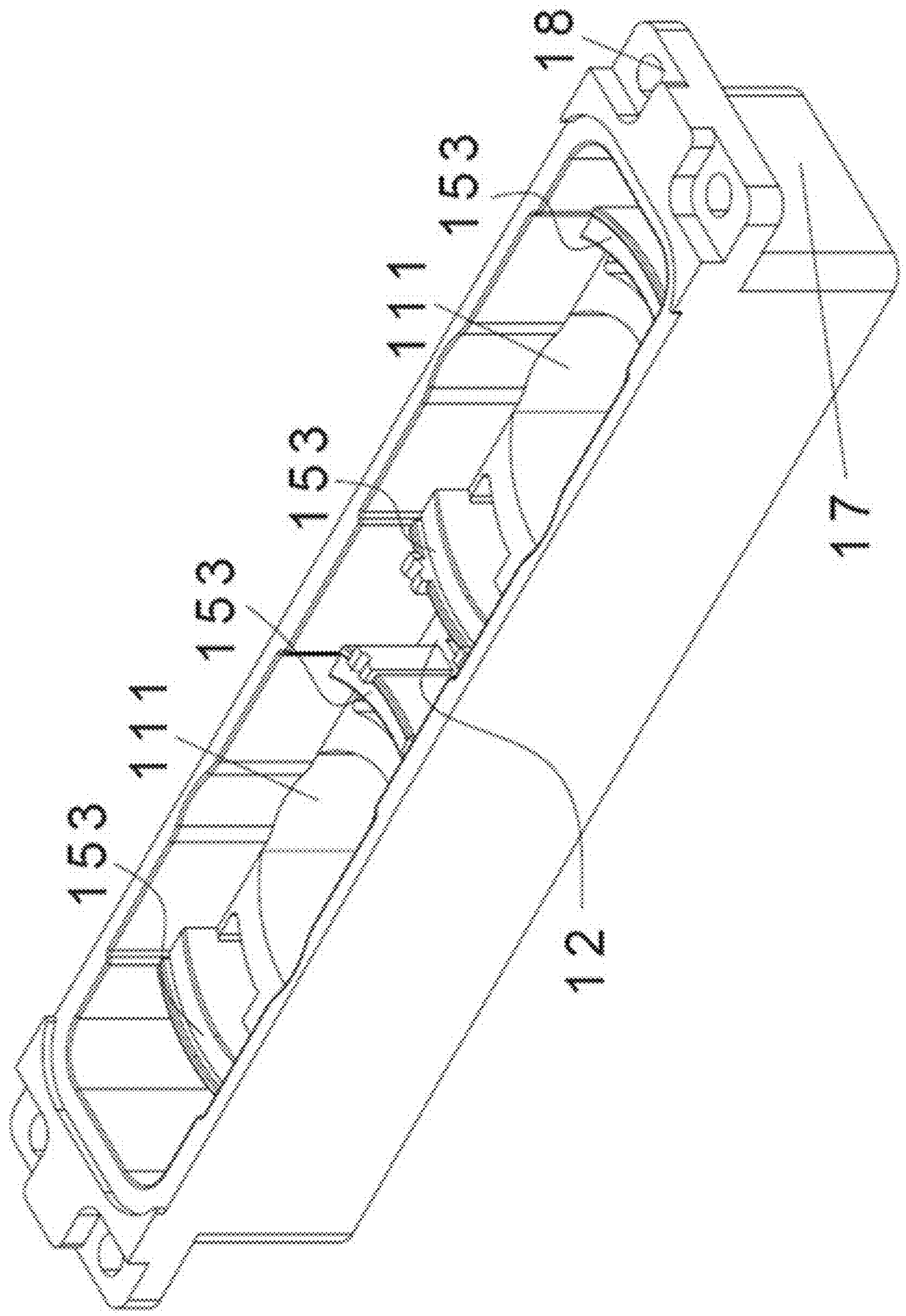
FIG. 4 shows a schematic structural view of the frame in FIG. 3 from another perspective.

As shown in FIGS. 3 and 4, the frame 10 further includes two vertical plates 17 and two lugs 18. Both ends of the vertical plates 17 are respectively connected to the two side walls 11. The two side walls 11 and the two vertical plates 17 are connected to form a rectangular structure. The two lugs 18 are respectively arranged on two vertical plates 17. This arrangement facilitates the connection between the speaker and the external device through the two lugs 18 and ensures the reliability of the connection of the speaker. Specifically, the frame 10 further includes a top cover 19, and the top cover 19, the bottom plate 16, the side walls 11 and the vertical plate 17 are connected to form a frame structure of the speaker.

Figure 5:
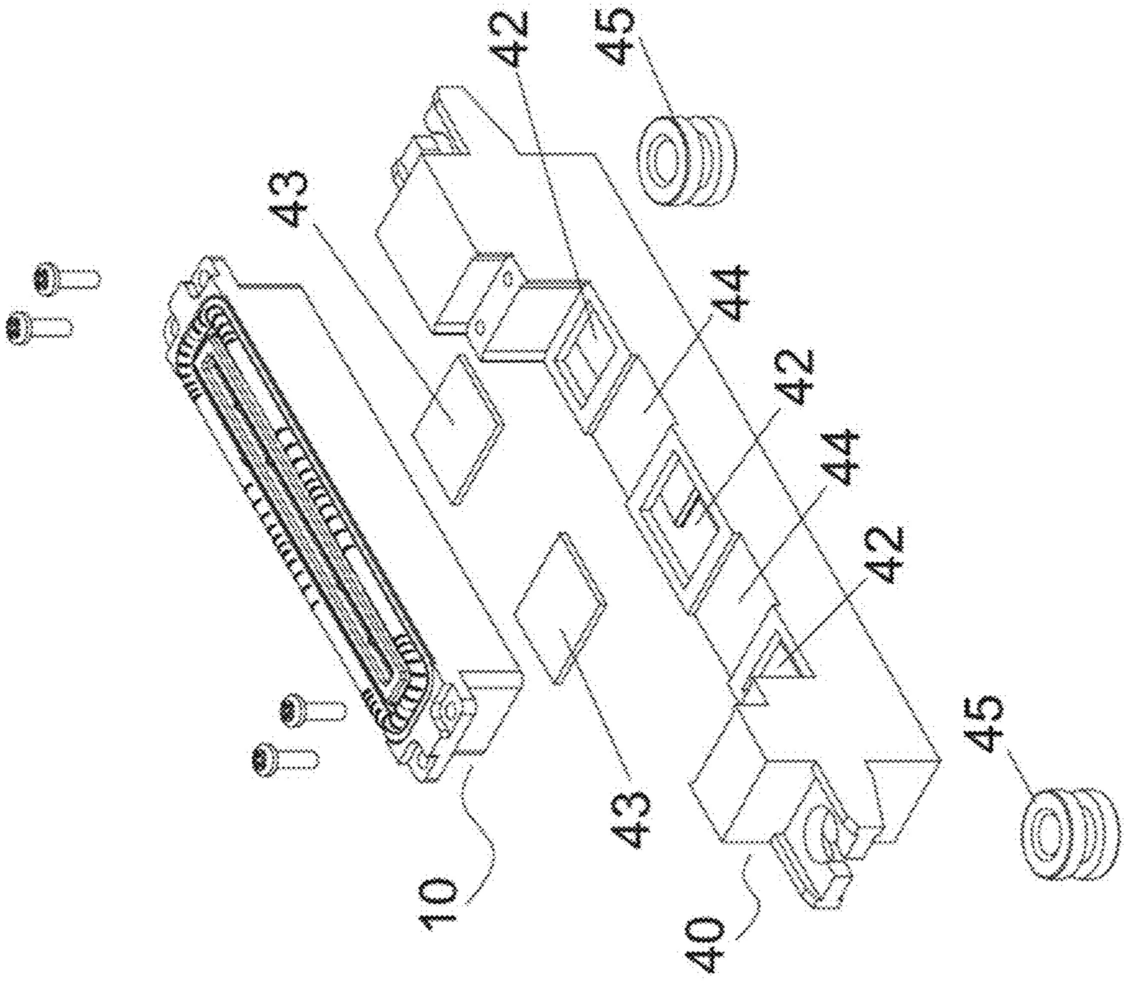
FIG. 5 shows a schematic structural diagram of a speaker box according to another embodiment of the present disclosure.
Figure 6:
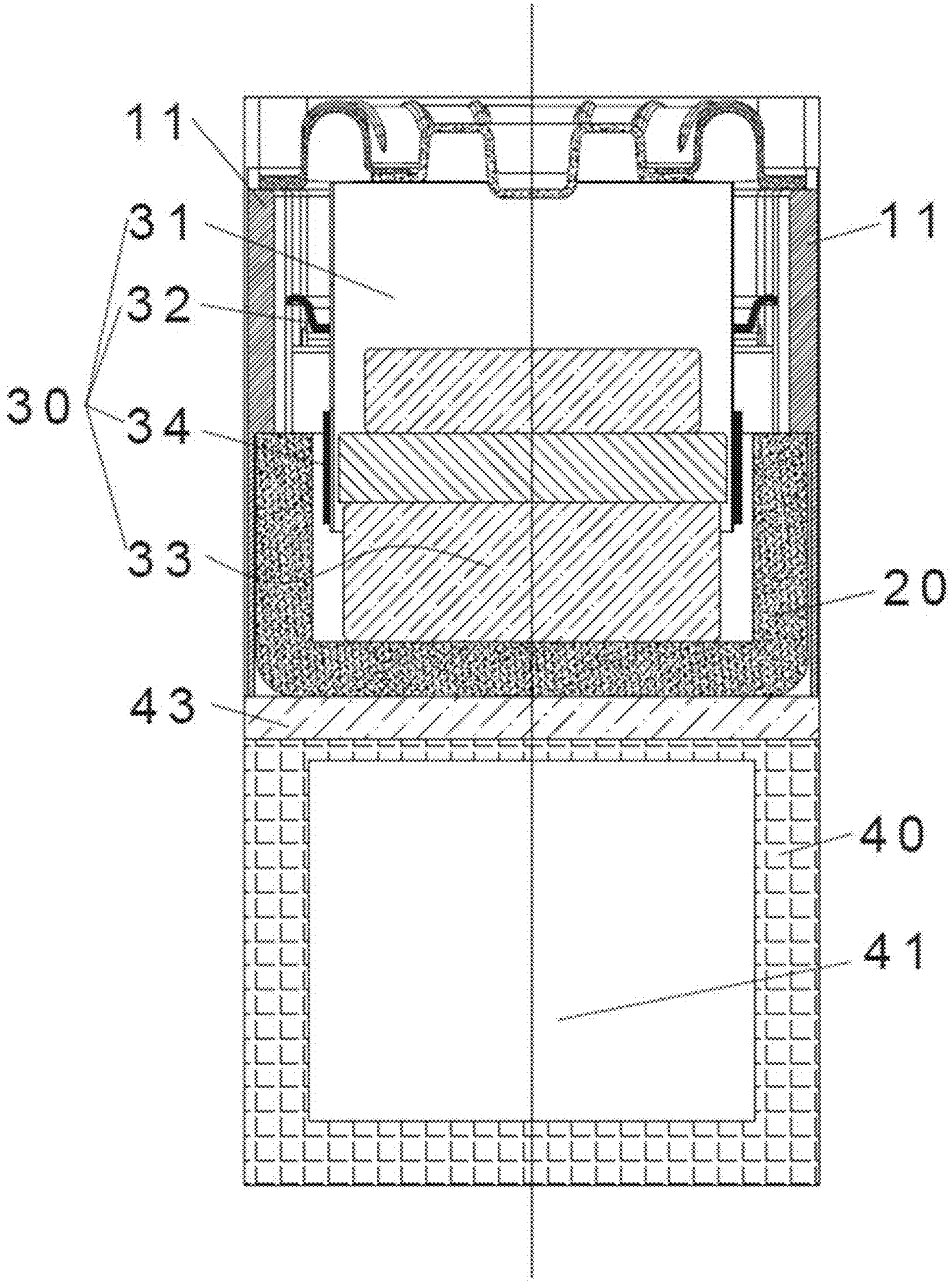
FIG. 6 shows a cross-sectional view of the speaker box of FIG. 5.

As shown in FIGS. 5 and 6, according to another embodiment of the present disclosure, a speaker box is provided. The speaker box includes a speaker box shell 40 and the above-mentioned speaker. The frame 10 of the speaker is connected to the speaker box shell 40.

Specifically, the speaker box shell 40 has a mounting groove, the speaker is arranged in the mounting groove, the side wall 11 of the speaker flushes with the side surface of the speaker box shell 40. The speaker box shell 40 has a balance cavity 41, and the bottom wall of the mounting groove has a plurality of communication holes 42 communicating with the balance cavity 41. A plurality of communication holes 42 are communicated with the accommodating cavity 12 of the speaker.

In this embodiment, when the speaker is in the working state, the air pressure generated at the bottom of the frame 10 is discharged through the balance hole 161 and enters the balance cavity 41. This arrangement completely isolates the forward radiating sound waves and backward radiating sound waves of the speaker and increases the lowest resonance frequency of the speaker by utilizing the elastic effect of the compressed air mass in the speaker box, thereby further improving the sound effect of the speaker.

Moreover, with this arrangement, the required airtight structure of the speaker is arranged at the bottom of the speaker, which ensures the airtightness during mounting and assembly of the speaker and the speaker box. The width of the frame 10 in the existing speaker is fully utilized, and the width of the frame 10 is made to be the narrowest. Moreover the outer diameter of the U-yoke 20 is close to or equal to the width of the frame 10, which increases the size of the voice coil 34, thereby effectively improving the power and sound quality of the speaker.

Specifically, the inner wall of the mounting groove has a positioning step, and the lugs 18 are provided at the positioning step and connected through a fastener. A connecting plate is provided on the outside of the speaker box shell 40. The connecting plate has an assembly hole. An elastic sleeve 45 is inserted into the assembly hole. The elastic sleeve 45 can provide a buffer for the connection between the speaker and the external device, thereby ensuring the reliability of the connection between the speaker and external device.

In some embodiments, the speaker box further includes a heat sink 43, the bottom wall of the mounting groove has a groove 44. The heat sink 43 is arranged in the groove 44, and the heat sink 43 fits the bottom surface of the U-yoke 20 of the speaker. By arranging the heat sink 43 on the bottom surface of the U-yoke 20, the heat dissipation performance of the speaker can be improved, and the power withstanding of the speaker can also be increased. Specifically, the heat sink 43 is a plate body with good thermal conductivity such as a metal plate.

Specifically, the assembly process of the speaker box is as follows: first arranging the heat sink 43 in the groove 44, and then installing the speaker into the mounting groove, abutting one end of the U-yoke 20 against the heat sink 43, and abutting the other end of the U-yoke 20 against the step surface between the accommodating cavity 12 and the mounting hole 13 to limit the position of the U-yoke 20, respectively sleeving the vibration piece 32 and the voice coil 34 of the voice coil portion 30 on both sides of the cylinder 31, arranging the vibration piece 32 on the limiting groove 153 to limit the entire voice coil portion 30, and extending a part of the cylinder 31 sleeved with the voice coil 34 into the U-yoke 20, and then connecting the lug 18 of the speaker and a positioning step through a fastener, so as to complete the assembly of the speaker.

The above descriptions are only preferred embodiments of the present disclosure and are not intended to limit the present disclosure. For those skilled in the art, the present disclosure may have various modifications and changes. Any modifications, equivalent replacements, improvements, etc. made within the spirit and principles of the present disclosure shall be included in the protection scope of the present disclosure.

What is claimed is:

1. A speaker, comprising:

a frame, the frame comprising two side walls disposed opposite to each other, wherein an interconnected accommodating cavity and a mounting hole are provided between the two side walls, maximum distance between the two side walls in the mounting hole is A, and distance between the two side walls in the accommodating cavity is B, wherein A>B;

a U-yoke, arranged in the mounting hole, wherein an outer wall of the U-yoke fits an inner wall of the mounting hole; and a voice coil portion, wherein a part of the voice coil portion is located in the U-yoke, and the other part of the voice coil portion is located in the accommodating cavity, wherein;

an inner side of the side wall has an arc-shaped surface which fits an outer wall of the U-yoke, and minimum wall thickness at a position of the arc-shaped surface of the side wall is smaller than wall thickness at other positions of the side wall; and the frame further comprises:

a connecting structure comprising two arc-shaped walls, wherein both ends of the arc-shaped walls are respectively connected to the two side walls, and the two arc-shaped walls and two opposite arc-shaped surfaces form mounting holes; and a bracket located between the two side walls, wherein the connecting structure is located in an area formed around the bracket, the voice coil portion comprises a cylinder and a vibration piece sleeved on the cylinder, and the vibration piece is connected to the bracket.

2. The speaker of claim 1, wherein the bracket comprises two support blocks and two connecting ribs, the two arc-shaped walls of the connecting structure are located between the two support blocks, each arc-shaped wall is connected to the corresponding support block by the connecting rib; and the support block has a limiting groove, and both ends of the vibration piece are respectively arranged in the limiting grooves of the two support blocks.

3. The speaker of claim 1, wherein the voice coil portion comprises a cylinder, an internal magnetic circuit structure and a voice coil, the cylinder extends into the U-yoke, one end of the internal magnetic circuit structure is located in the cylinder, the other end of the internal magnetic circuit structure abuts against the U-yoke, voice coil sleeves are provided on the cylinder, and the voice coil is located between the internal magnetic circuit structure and the U-yoke.

4. The speaker of claim 1, wherein the frame further comprises a bottom plate, and the bottom plate is connected to the two side walls, the bottom plate is away from the mounting holes, the outer surface of the bottom plate flushes with end faces of the side walls, and the bottom surface of the U-yoke flushes with the outer surface of the bottom plate.

5. The speaker of claim 4, wherein a plurality of balance holes are provided on the bottom plate, and each balance hole is communicated with the accommodating cavity.

6. The speaker of claim 1, wherein the frame is provided with a plurality of mounting holes, and a plurality of U-yokes are arranged in the plurality of mounting holes in one-to-one correspondence, the outer surfaces of the two side walls are both planes, and the outer surfaces of the two side walls are parallel to each other.

7. The speaker of claim 1, wherein the frame further comprises two vertical plates and two lugs, both ends of the vertical plates are respectively connected to the two side walls, the two side walls and the two vertical plates are connected to form a rectangular structure, and the two lugs are respectively arranged on two vertical plates.

8. A speaker box, comprising:

a speaker box shell; and a speaker, the speaker comprising:

a frame, the frame comprising two side walls disposed opposite to each other, wherein an interconnected accommodating cavity and a mounting hole are provided between the two side walls, maximum distance between the two side walls in the mounting hole is A, distance between the two side walls in the accommodating cavity is B, wherein A>B, and the frame connects to the speaker box shell;

a U-yoke, arranged in the mounting hole, wherein an outer wall of the U-yoke fits an inner wall of the mounting hole; and a voice coil portion, wherein a part of the voice coil portion is located in the U-yoke, and the other part of the voice coil portion is located in the accommodating cavity, wherein;

an inner side of the side wall has an arc-shaped surface which fits an outer wall of the U-yoke, and minimum wall thickness at a position of the arc-shaped surface of the side wall is smaller than wall thickness at other positions of the side wall; and the frame further comprises:

a connecting structure comprising two arc-shaped walls, wherein both ends of the arc-shaped walls are respectively connected to the two side walls, and the two arc-shaped walls and two opposite arc-shaped surfaces form mounting holes; and a bracket located between the two side walls, wherein the connecting structure is located in an area formed around the bracket, the voice coil portion comprises a cylinder and a vibration piece sleeved on the cylinder, and the vibration piece is connected to the bracket.

9. The speaker box of claim 8, wherein the speaker box shell has a mounting groove, the speaker is arranged in the mounting groove, the side wall of the speaker flushes with the side surface of the speaker box shell, the speaker box shell has a balance cavity, and a bottom wall of the mounting groove has a plurality of communication holes, and the plurality of communication holes are communicated with the accommodating cavity of the speaker.

10. The speaker box of claim 9, wherein the speaker box further comprises a heat sink, the bottom wall of the mounting groove has a groove, the heat sink is arranged in the groove, and the heat sink fits a bottom surface of the U-yoke of the speaker.

* * * * *